US012675035B2

(12) United States Patent (10) Patent No.: US 12,675,035 B2
Crystal et al. (45) Date of Patent: Jul. 7, 2026

(54) COMPUTER PROJECTOR SYSTEM AND METHOD FOR CUSTOM LABELLING OF APPAREL

(71) Applicant: Avery Dennison Retail Information Services LLC, Mentor, OH (US)

(72) Inventors: Adam Crystal, Toronto (CA); Kevin Carkner, Toronto (CA)

(73) Assignee: Avery Dennison Retail Information Services LLC, Mentor, OH (US)

( * ) Notice: Subject to any disclaimer, the term of this patent is extended or adjusted under 35 U.S.C. 154(b) by 314 days.

(21) Appl. No.: 18/501,284

(22) Filed: Nov. 3, 2023

(65) Prior Publication Data

US 2024/0152040 A1 May 9, 2024

Related U.S. Application Data

(60) Provisional application No. 63/422,898, filed on Nov. 4, 2022.

(51) Int. Cl.
*G03B 21/134* (2006.01)
*A41D 27/08* (2006.01)
(Continued)

(52) U.S. Cl.
CPC ........... *G03B 21/134* (2013.01); *A41D 27/08* (2013.01); *A41H 43/04* (2013.01); *G03B 21/14* (2013.01)

(58) Field of Classification Search
CPC ...... G03B 21/134; G03B 21/14; A41D 27/08; A41H 43/04
See application file for complete search history.

(56) References Cited

U.S. PATENT DOCUMENTS 4,439,157 A * 3/1984 Breglia .............. G02B 27/0172
359/618
6,543,899 B2 * 4/2003 Covannon ............ G02B 27/017
353/11
(Continued)

FOREIGN PATENT DOCUMENTS

AU 2009282683 6/2012
AU 2011202173 9/2014
(Continued)

OTHER PUBLICATIONS

International Search Report and Written Opinion dated Jan. 23, 2024 issued in corresponding IA No. PCT/CA2023/051476 filed Nov. 3, 2023.
(Continued)

*Primary Examiner* — Michael B. Pierorazio

(57) ABSTRACT

A computer projector system and method for customization (labelling) of apparel and merchandise. The computer projector system provides virtual customer-assisted layout of apparel and merchandise targeted towards customization of branded sports merchandise which is manually assembled or pressed. The computer projector system consists of a mechanical arm attached to a heat press, a mini projector, a computer and cloud-based software with a database of customization of embellishments. The computer projector system displays an image of the customized set of numbers, letters, or patch design directly on the apparel (or other merchandise), so that the operator can manually place and press the components in a highly efficient and accurate manner. The computer projector system also addresses the problem of automatically correcting for kerning and arcing on customized product in accordance with pre-determined guidelines in the sports and entertainment industries.

11 Claims, 17 Drawing Sheets

(51) Int. Cl.
  *A41H 43/04*   (2006.01)
  *G03B 21/14*   (2006.01)

(56)    References Cited

U.S. PATENT DOCUMENTS

| | | | | |
|---|---|---|---|---|
| 6,652,104 | B2 * | 11/2003 | Nishida | H04N 9/3185 |
| | | | | 353/69 |
| 6,877,863 | B2 * | 4/2005 | Wood | H04N 9/3185 |
| | | | | 353/42 |
| 7,070,283 | B2 * | 7/2006 | Akutsu | H04N 5/74 |
| | | | | 353/30 |
| 7,119,965 | B1 * | 10/2006 | Rolland | G02B 27/0172 |
| | | | | 359/630 |
| 7,146,649 | B2 * | 12/2006 | Kronenbeger | A42B 1/248 |
| | | | | 2/209.13 |
| 7,182,466 | B2 * | 2/2007 | Sunaga | H04N 5/74 |
| | | | | 353/69 |
| 7,270,421 | B2 * | 9/2007 | Shinozaki | G03B 21/142 |
| | | | | 353/121 |
| 7,359,575 | B2 * | 4/2008 | Bassi | G06T 3/18 |
| | | | | 345/427 |
| 7,441,906 | B1 * | 10/2008 | Wang | G03B 21/14 |
| | | | | 353/121 |
| 7,467,418 | B2 * | 12/2008 | Kronenberger | G09F 21/02 |
| | | | | 2/244 |
| 7,782,387 | B2 * | 8/2010 | Azuma | H04N 25/68 |
| | | | | 359/662 |
| 8,090,461 | B2 | 1/2012 | Ohiaeri et al. | |
| 8,199,966 | B2 | 6/2012 | Guven et al. | |
| 8,348,371 | B2 | 1/2013 | McDowell et al. | |
| 8,639,585 | B2 | 1/2014 | Paul et al. | |
| 8,644,975 | B2 | 2/2014 | Paul et al. | |
| 8,676,427 | B1 * | 3/2014 | Ferguson | G08G 1/0965 |
| | | | | 701/23 |
| 9,087,355 | B2 | 7/2015 | Ohiaeri et al. | |
| 9,120,326 | B2 | 9/2015 | Will et al. | |
| 9,141,931 | B2 | 9/2015 | Ackerman | |
| 9,269,102 | B2 | 2/2016 | Chen et al. | |
| 9,330,407 | B2 | 5/2016 | Beaver et al. | |
| 9,333,788 | B2 | 5/2016 | Will et al. | |
| 9,390,424 | B2 | 7/2016 | Hendrickson | |
| 9,403,394 | B2 | 8/2016 | Rosner et al. | |
| 9,446,599 | B2 | 9/2016 | Will et al. | |
| 9,545,808 | B2 | 1/2017 | Rosner et al. | |
| 9,704,187 | B2 | 7/2017 | Chen et al. | |
| 9,731,534 | B2 | 8/2017 | Will et al. | |
| 9,734,527 | B2 | 8/2017 | Collier et al. | |
| 9,753,126 | B2 * | 9/2017 | Smits | G01S 17/003 |
| 9,810,913 | B2 * | 11/2017 | Smits | G02B 5/124 |
| 9,858,606 | B1 | 1/2018 | Mar et al. | |
| 9,924,749 | B2 | 3/2018 | Walker | |
| 9,971,854 | B1 | 5/2018 | Bowen et al. | |
| 10,011,120 | B2 | 7/2018 | Will et al. | |
| 10,016,986 | B2 | 7/2018 | Will et al. | |
| 10,065,442 | B2 | 9/2018 | Will et al. | |
| 10,067,230 | B2 * | 9/2018 | Smits | G01S 17/86 |
| 10,115,143 | B2 | 10/2018 | Lory | |
| 10,127,480 | B1 | 11/2018 | Lehrer et al. | |
| 10,140,392 | B1 | 11/2018 | Bowen | |
| 10,228,682 | B2 | 3/2019 | Colaianni et al. | |
| 10,254,941 | B2 | 4/2019 | Bowen | |
| 10,261,183 | B2 * | 4/2019 | Smits | G01S 7/4868 |
| 10,269,174 | B2 | 4/2019 | Torvinen et al. | |
| 10,304,106 | B2 | 5/2019 | Paul et al. | |
| 10,379,220 | B1 * | 8/2019 | Smits | G01S 7/4811 |
| 10,394,112 | B2 * | 8/2019 | Johnson | A01M 1/223 |
| 10,417,682 | B2 | 9/2019 | Oayda et al. | |
| 10,437,446 | B2 | 10/2019 | Bowen | |
| 10,473,921 | B2 * | 11/2019 | Smits | G01S 17/87 |
| 10,496,763 | B2 | 12/2019 | Bowen | |
| 10,586,261 | B2 | 3/2020 | Baig | |
| 10,591,605 | B2 * | 3/2020 | Smits | G01S 17/42 |
| 10,600,095 | B2 | 3/2020 | Ackerman | |
| 10,618,133 | B1 | 4/2020 | Schultz et al. | |

| | | | | |
|---|---|---|---|---|
| 10,628,715 | B2 | 4/2020 | Lehrer et al. | |
| 10,650,429 | B2 | 5/2020 | Gerson | |
| 10,663,626 | B2 * | 5/2020 | Benitez | G02B 27/01 |
| 10,664,882 | B2 | 5/2020 | Chen et al. | |
| 10,675,860 | B2 * | 6/2020 | Drees | B41F 16/02 |
| 10,687,573 | B2 | 6/2020 | Schultz et al. | |
| 10,698,474 | B2 | 6/2020 | Colaianni et al. | |
| 10,793,998 | B2 * | 10/2020 | Sights | D06P 5/15 |
| 10,802,692 | B2 | 10/2020 | Bowen | |
| 10,817,921 | B2 | 10/2020 | Collier et al. | |
| 10,820,650 | B2 * | 11/2020 | Bell | G06F 3/04845 |
| 10,863,924 | B2 | 12/2020 | Decker | |
| 10,883,223 | B2 | 1/2021 | Schultz et al. | |
| 10,918,151 | B2 | 2/2021 | Mahanty et al. | |
| 10,997,642 | B2 | 5/2021 | Chen et al. | |
| 11,000,086 | B2 | 5/2021 | Mahanty et al. | |
| 11,026,461 | B2 | 6/2021 | Schultz et al. | |
| 11,026,462 | B2 | 6/2021 | Schultz et al. | |
| 11,051,571 | B2 | 7/2021 | Schultz et al. | |
| 11,058,163 | B2 | 7/2021 | Schultz et al. | |
| 11,140,936 | B2 | 10/2021 | Schultz et al. | |
| 11,195,219 | B2 | 12/2021 | Cloak | |
| 11,241,053 | B2 | 2/2022 | Love et al. | |
| 11,241,054 | B2 | 2/2022 | Love et al. | |
| 11,241,055 | B2 | 2/2022 | Love et al. | |
| 11,256,403 | B2 | 2/2022 | Bowen | |
| 11,257,297 | B1 | 2/2022 | Go | |
| 11,276,020 | B1 | 3/2022 | Samuel | |
| 11,286,614 | B2 | 3/2022 | Sights et al. | |
| 11,313,072 | B2 | 4/2022 | Sights et al. | |
| 11,347,209 | B2 | 5/2022 | Page et al. | |
| 11,352,738 | B2 | 6/2022 | Sights et al. | |
| 11,352,739 | B2 | 6/2022 | Bell et al. | |
| 11,366,453 | B2 | 6/2022 | Alun-Jones et al. | |
| 11,409,267 | B2 | 8/2022 | Page et al. | |
| 11,478,033 | B2 | 10/2022 | Gerson et al. | |
| 11,479,907 | B2 | 10/2022 | O'Neill et al. | |
| 11,481,942 | B2 | 10/2022 | Geivet et al. | |
| 11,485,577 | B1 | 11/2022 | Hoshino et al. | |
| 11,492,199 | B1 | 11/2022 | Hoshino et al. | |
| 11,498,762 | B1 | 11/2022 | Hoshino et al. | |
| 11,498,763 | B1 | 11/2022 | Hoshino et al. | |
| 11,501,597 | B1 * | 11/2022 | Hoshino | A47F 10/00 |
| 11,509,624 | B2 | 11/2022 | Repka | |
| 11,524,507 | B1 * | 12/2022 | Hoshino | B41F 16/02 |
| 11,530,503 | B2 * | 12/2022 | Bell | G06Q 30/0643 |
| 11,542,097 | B1 * | 1/2023 | Hoshino | B65G 47/905 |
| 11,544,755 | B2 | 1/2023 | Newbury et al. | |
| 11,549,211 | B2 | 1/2023 | Sights et al. | |
| 11,562,423 | B2 * | 1/2023 | Sights | A41H 42/00 |
| 11,613,843 | B2 | 3/2023 | Schultz et al. | |
| 11,615,666 | B1 * | 3/2023 | Hoshino | G07F 11/64 |
| | | | | 700/233 |
| 11,618,995 | B2 | 4/2023 | Bell et al. | |
| 11,623,823 | B1 * | 4/2023 | Hoshino | B65G 47/61 |
| | | | | 700/233 |
| 11,623,824 | B1 | 4/2023 | Hoshino et al. | |
| 11,628,976 | B1 | 4/2023 | Hoshino et al. | |
| 11,676,200 | B2 | 6/2023 | Wade et al. | |
| 11,678,706 | B2 | 6/2023 | Gerson et al. | |
| 11,680,366 | B2 | 6/2023 | Schultz et al. | |
| 11,680,367 | B2 | 6/2023 | Mahanty et al. | |
| 11,697,903 | B2 | 7/2023 | Schultz et al. | |
| 11,702,792 | B2 | 7/2023 | Schultz et al. | |
| 11,702,793 | B2 | 7/2023 | Schultz et al. | |
| 11,704,614 | B1 | 7/2023 | Samuel | |
| 11,708,662 | B2 | 7/2023 | Mahanty et al. | |
| 11,708,663 | B2 | 7/2023 | Schultz et al. | |
| 11,712,121 | B1 | 8/2023 | Hoshino et al. | |
| 11,714,399 | B2 | 8/2023 | Page et al. | |
| 11,723,426 | B2 | 8/2023 | O'Neill et al. | |
| 11,741,515 | B2 | 8/2023 | Chen et al. | |
| 11,830,455 | B2 * | 11/2023 | Schriever | G09G 5/005 |
| 11,833,809 | B1 * | 12/2023 | Hoshino | G06Q 10/087 |
| 12,304,233 | B1 * | 5/2025 | Kusnitz | B44C 1/1712 |
| 2002/0051095 | A1 * | 5/2002 | Su | H04N 9/3194 |
| | | | | 348/745 |
| 2002/0067466 | A1 * | 6/2002 | Covannon | G02B 30/26 |
| | | | | 353/8 |

(56) References Cited

U.S. PATENT DOCUMENTS

| | | | | |
|---|---|---|---|---|
| 2002/0122161 A1* | 9/2002 | Nishida | H04N 9/3194 | 353/70 |
| 2003/0191836 A1* | 10/2003 | Murtha | H04L 67/02 | 709/224 |
| 2003/0210381 A1* | 11/2003 | Itaki | H04N 5/74 | 353/70 |
| 2004/0156024 A1* | 8/2004 | Matsuda | H04N 9/3185 | 353/70 |
| 2005/0046803 A1* | 3/2005 | Akutsu | H04N 5/74 | 353/69 |
| 2005/0073661 A1* | 4/2005 | Tamura | H04N 9/3194 | 353/70 |
| 2005/0151934 A1* | 7/2005 | Akutsu | G03B 21/147 | 353/69 |
| 2005/0188447 A1* | 9/2005 | Gray | A41D 27/08 | 2/115 |
| 2005/0237492 A1* | 10/2005 | Shinozaki | H04N 9/3185 | 353/69 |
| 2006/0098167 A1* | 5/2006 | Sato | G03B 21/26 | 353/35 |
| 2006/0203207 A1* | 9/2006 | Ikeda | H04N 9/3185 | 353/70 |
| 2007/0008344 A1* | 1/2007 | Medina | G06T 15/10 | 345/647 |
| 2007/0257941 A1* | 11/2007 | Plut | G06F 9/451 | 345/660 |
| 2007/0285626 A1* | 12/2007 | Miyasaka | G03B 21/206 | 353/85 |
| 2009/0278999 A1* | 11/2009 | Ofune | H04N 21/47 | 348/E3.048 |
| 2010/0002123 A1* | 1/2010 | Nozaki | H04N 23/00 | 348/E5.022 |
| 2010/0045942 A1* | 2/2010 | Furui | H04N 9/3194 | 353/69 |
| 2010/0058510 A1* | 3/2010 | Vithlani | A41D 27/08 | 2/244 |
| 2011/0085044 A1* | 4/2011 | Noda | G03B 21/58 | 348/E5.133 |
| 2011/0210979 A1* | 9/2011 | Furui | G03B 37/04 | 345/619 |
| 2011/0234994 A1* | 9/2011 | Uchiyama | H04N 9/3185 | 353/121 |
| 2011/0285971 A1* | 11/2011 | Oka | H04N 9/3185 | 353/70 |
| 2011/0292351 A1* | 12/2011 | Ishii | H04N 9/3185 | 353/69 |
| 2012/0284895 A1* | 11/2012 | Pace | G09F 21/02 | 2/400 |
| 2013/0245877 A1* | 9/2013 | Ferguson | G06V 20/56 | 701/23 |
| 2014/0026773 A1 | 1/2014 | Miller | | |
| 2014/0303827 A1* | 10/2014 | Dolgov | B60W 30/00 | 701/23 |
| 2015/0052657 A1* | 2/2015 | Miller | A41D 13/0015 | 2/93 |
| 2015/0094897 A1* | 4/2015 | Cuddihy | B60W 30/00 | 701/23 |
| 2015/0336502 A1* | 11/2015 | Hillis | G05D 1/0088 | 701/23 |
| 2015/0360460 A1* | 12/2015 | Livingston | B41F 15/28 | 347/110 |
| 2016/0015101 A1* | 1/2016 | Stefanovic | A41D 27/08 | 2/244 |
| 2016/0041373 A1* | 2/2016 | Akiyama | G02B 15/1465 | 359/749 |
| 2017/0240096 A1* | 8/2017 | Ross | G05D 1/0212 | |
| 2018/0125170 A1 | 5/2018 | Hill et al. | | |
| 2018/0158102 A1* | 6/2018 | Choi | G06Q 30/0251 | |
| 2018/0361730 A1 | 12/2018 | Robinson et al. | | |
| 2019/0228448 A1 | 7/2019 | Bleicher et al. | | |
| 2020/0027147 A1* | 1/2020 | Dahlstrom | G06Q 20/18 | |
| 2020/0063310 A1 | 2/2020 | Bell et al. | | |
| 2020/0174130 A1* | 6/2020 | Banerjee | B60R 11/04 | |
| 2021/0004610 A1* | 1/2021 | Huang | G01S 17/10 | |
| 2021/0118031 A1 | 4/2021 | Beaver, III et al. | | |
| 2021/0142379 A1 | 5/2021 | Bleicher et al. | | |
| 2021/0168440 A1* | 6/2021 | Ho | H04N 21/43632 | |
| 2021/0205999 A1* | 7/2021 | Mecca | B25J 9/1615 | |
| 2021/0266352 A1 | 8/2021 | Beaver, III et al. | | |
| 2021/0310823 A1* | 10/2021 | Wilbers | G01C 21/3811 | |
| 2021/0341310 A1* | 11/2021 | Wilbers | G01C 21/26 | |
| 2021/0400117 A1 | 12/2021 | Mishra et al. | | |
| 2022/0039874 A1* | 2/2022 | Choi | A61B 90/39 | |
| 2022/0171412 A1* | 6/2022 | Cui | G08B 3/10 | |
| 2022/0201262 A1* | 6/2022 | Chen | H04N 9/3185 | |
| 2022/0242430 A1* | 8/2022 | Watano | G10L 15/25 | |
| 2022/0288918 A1* | 9/2022 | Yardley | B41J 11/06 | |
| 2022/0318874 A1* | 10/2022 | Beaver, III | G06Q 30/0621 | |
| 2022/0323874 A1* | 10/2022 | Jeromin | A63G 31/00 | |
| 2022/0391846 A1* | 12/2022 | Beaver, III | G06Q 30/0621 | |
| 2023/0010713 A1* | 1/2023 | Park | G01S 17/88 | |
| 2023/0030662 A1* | 2/2023 | Beaver, III | G06Q 50/04 | |
| 2023/0046503 A1 | 2/2023 | Bell et al. | | |
| 2023/0051783 A1 | 2/2023 | Sights et al. | | |
| 2023/0377197 A1* | 11/2023 | Napolskikh | G01C 11/06 | |
| 2025/0204628 A1* | 6/2025 | de Vaal | A41H 27/00 | |

FOREIGN PATENT DOCUMENTS

| | | |
|---|---|---|
| AU | 2014256850 | 5/2017 |
| AU | 2018260888 | 1/2021 |
| AU | 2020369453 | 3/2022 |
| AU | 2020412699 | 3/2023 |
| CA | 2763934 | 11/2015 |
| CA | 2737908 | 1/2017 |
| CA | 2761911 | 11/2020 |
| CA | 3150117 | 4/2021 |
| CA | 3115109 | 12/2021 |
| CA | 3023167 | 4/2022 |
| EP | 2499588 | 5/2015 |
| EP | 3024652 | 12/2019 |
| EP | 2391114 | 2/2020 |
| EP | 2798602 | 4/2020 |
| EP | 3146490 | 10/2020 |
| EP | 4049221 | 8/2022 |
| EP | 3252668 | 1/2023 |
| EP | 3251536 | 11/2023 |
| GB | 2588550 | 3/2023 |
| WO | 2022/231705 | 11/2022 |
| WO | 2023/010211 | 2/2023 |

OTHER PUBLICATIONS

One Degree Life: $46 Laser Alignment System: Heat Press, Shirt Design, Crafts, Jan. 25, 2021, Retrieved from the Internet: https://www.youtube.com/watch?v=B-xdfTt_Nwl&t=100s, minutes 3:10-3:30, retrieved on Mar. 20, 2024.

* cited by examiner

100

106

102

104

108

ORDER CAPTURE

702

ORDER MANAGEMENT

* TICKET / VIRTUAL TICKET
* DETAILED / SIMPLISTIC
* BARCODES
* 2 BARCODES PER TICKET
* ONE FOR RETAILER POS / PAYMENT
* ONE FOR THE FANZONES SYSTEM 1102    1104

1106

COMPUTER PROJECTOR SYSTEM AND METHOD FOR CUSTOM LABELLING OF APPAREL

CROSS REFERENCE TO RELATED APPLICATIONS

This application claims priority to and the benefit of U.S. Provisional Application Ser. No. 63/422,898, entitled "COMPUTER PROJECTOR SYSTEM AND METHOD FOR CUSTOM LABELLING OF APPAREL", filed on Nov. 4, 2022, the disclosure of which is incorporated herein by reference in its entirety.

BACKGROUND

The field of the disclosure relates to apparel labelling systems, in particular, a system for custom labelling of apparel.

Consumers attending sporting, music and other events often seek to purchase customized and embellished merchandise or apparel such as jerseys, T-Shirts, bags, and pants that include their own name, and/or the names, numbers or logos of the team that they support.

Traditional methods used to customize the merchandise typically relies on a verbal or written explanation of what the customization requirement is. The physical samples of the customization samples are then chosen and pressed onto the product by way of measurement, judgement, and centering.

Traditional methods are time consuming, judgmental, and subject to error or misplacement. For example, a player's name and number on a sports jersey may be placed mis-centred or mis-spelled; long names may arc differently; numbers can be placed upside down and letters and numbers kern differently depending on their width (i.e., an '1' vs a '0' or an 'i' vs a 'W').

More advanced methods may utilize a computer display showing a photograph of the merchandise along with a proposed layout of customizations displayed digitally on the image. The weakness of such a system is that the physical placement and pressing of the actual product is still a manual process, based again on that person's perception, memory or interpretation of the image presented.

Mistakes cause wasted branded product (i.e., the company has to write-off the merchandise) and additional time is wasted.

Furthermore, placement of the merchandise on the press is a manual process and frequently does not match exactly with the placement that was displayed on the computer screen or on the physical samples shown to the customer.

There is a need for a system that accurately calculates spacing and presentation of images; while also allowing further customization manipulations—but then efficiently gets the placement of that onto the product to be pressed with a high degree of accuracy so there are no "surprises" when the customizations are pressed (or embroidered or printed) onto the merchandise placed for customization.

BRIEF DESCRIPTION OF THE DRAWINGS

FIG. 18 is a close-up view illustrating the exemplary computer projector system.

SUMMARY

A computer projector system and method for custom labelling of apparel and merchandise. The computer projector system provides virtual customer assisted layout of apparel and merchandise targeted towards customization of branded sports merchandise. The computer projector system consists of a mechanical arm attached to a heat press, a mini projector, a computer and cloud-based software with a database of customization of embellishments. The computer projector system displays an image of the customized set of numbers, letters or patch design directly on the apparel (or other merchandise), so that the operator can place and press the components in a highly efficient and accurate manner. The computer projector system also addresses the problem of automatically correcting for kerning and arcing on customized product in accordance with pre-determined guidelines in the sports and entertainment industries.

DETAILED DESCRIPTION

The disclosure addresses the above deficiencies by using a computer projector system having an image projector in conjunction with customization software, which delivers the image directly onto the press. The computer projector system is also referred to as an accurate alignment projector system (AAPS).

Figure 1A:
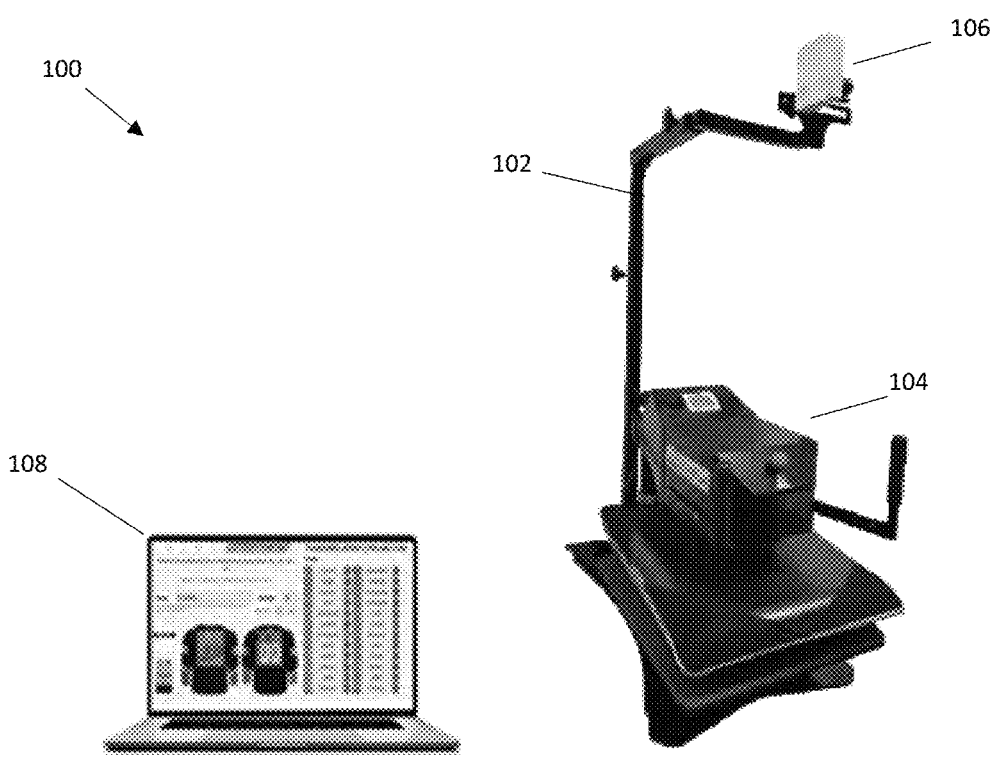
FIG. 1A is a diagram illustrating an exemplary computer projector system.

FIG. 1A is a diagram illustrating an exemplary accurate alignment projector system (AAPS) or computer projector system.

According to FIG. 1A, the computer projector system 100 consists of the following components:

a mounting stand 102, a heat press 104, a mini projector 106, a computer 108, cables, and cloud-based software program with database of customization embellishments.

According to FIG. 1A, the fully adjustable mounting stand 102 of the computer projector system 100 consists of a base clamp, a mounting post, an adjustable mechanical arm (i.e., projector mount) and an adapter to mount a heat press 104. The mounting post detachably attaches to the heat press 104 and the mechanical arm connects to the mini projector 106. The mini projector 106 is configured to support 4K and HD (high definition) and has dimensions of 2" height by 5" width by 5" depth.

According to FIG. 1A, computer 108 can be a desktop or laptop computer configured to connected and shared file site with data files and customization programs (i.e., AAPS software). In further embodiments, computer 108 can be a mobile phone or tablet.

Figure 1B:

The desired merchandise is placed on the press, image reference points are aligned, and the customizations are then projected directly onto the merchandise. Customizations can be manipulated and instantly displayed on the merchandise and the merchandise can be repositioned at will to ensure an exact match to customer expectations. Numbers, letters or patches are then placed onto the product according to the exact images and then physically pressed into place. When the press is opened, the customized merchandise will have the exact customizations in the exact locations. This is done in a very efficient manner, reducing layout time and eliminating errors and waste. FIG. 1B is a close-up view illustrating the exemplary computer projector system creating labels for a jersey.

Figure 2A:
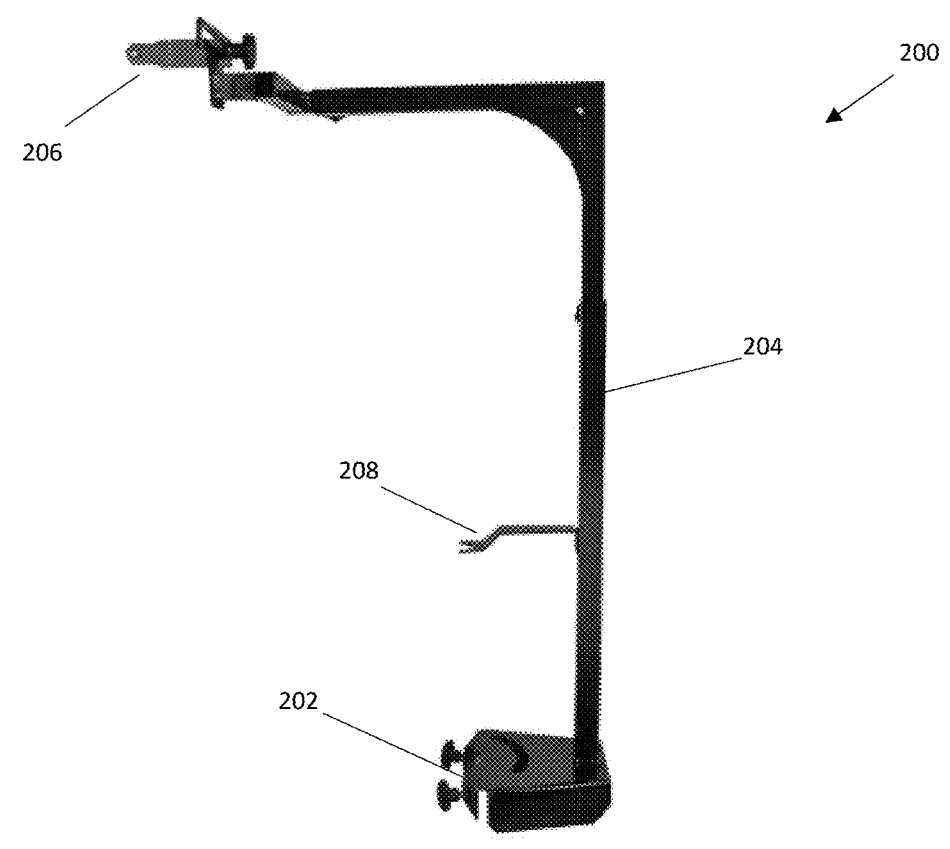
FIG. 2A is a diagram illustrating an assembled view of the mounting stand.
Figure 2B:
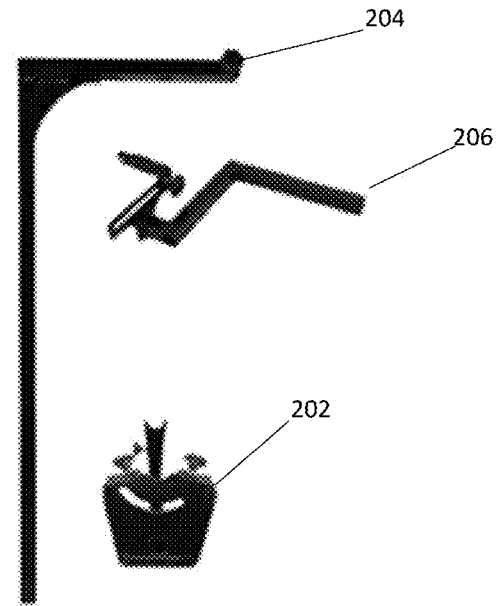
FIG. 2B is a diagram illustrating a dis-assembled view of the mounting stand.

FIG. 2A is a diagram illustrating an assembled view of the mounting stand. FIG. 2B is a diagram illustrating a disassembled view of the mounting stand. According to FIGS. 2A and 2B, mounting stand 200 consists of base clamp 202, mounting post 204, heat press mount 208 and an adjustable projector mount 206.

According to FIG. 2A, adjustable projector mount 206 is a mechanical arm that attaches to a mini projector (106 of FIG. 1). Base clamp 202 has dimensions of approximately 8 inches by 11 inches and a weight range of 2 pounds to 10 pounds.

According to FIG. 2A, dimensions of mounting stand 200 when assembled are approximately 48" height by 16" width by 32" depth.

Figure 3A:
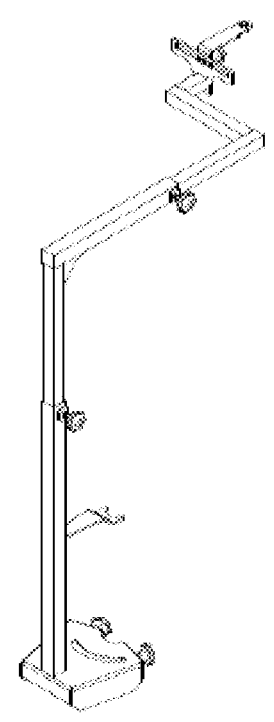
FIG. 3A is a line drawing of a perspective view of the mounting stand.
Figure 3B:
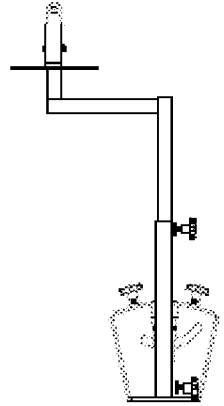
FIG. 3B is a line drawing of a top plan view of the mounting stand.
Figure 3C:
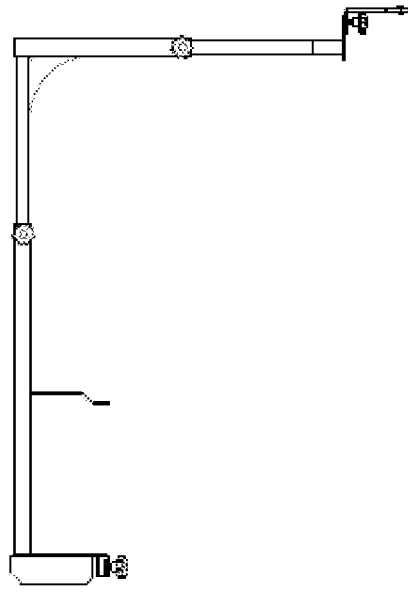
FIG. 3C is a line drawing of a right-side view of the mounting stand.
Figure 3D:
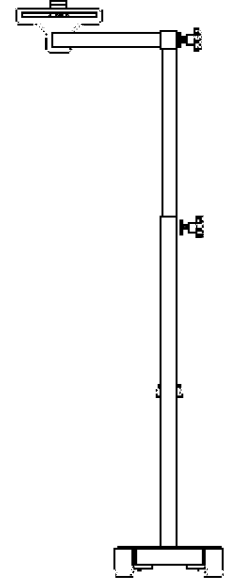
FIG. 3D is a line drawing of a left-side view of the mounting stand.

FIGS. 3A to 3D are different views of the mounting stand. FIG. 3A is a line drawing of a perspective view of the mounting stand. FIG. 3B is a line drawing of a top plan view of the mounting stand. FIG. 3C is a line drawing of a right-side view of the mounting stand. FIG. 3D is a line drawing of a left-side view of the mounting stand.

Figure 4:
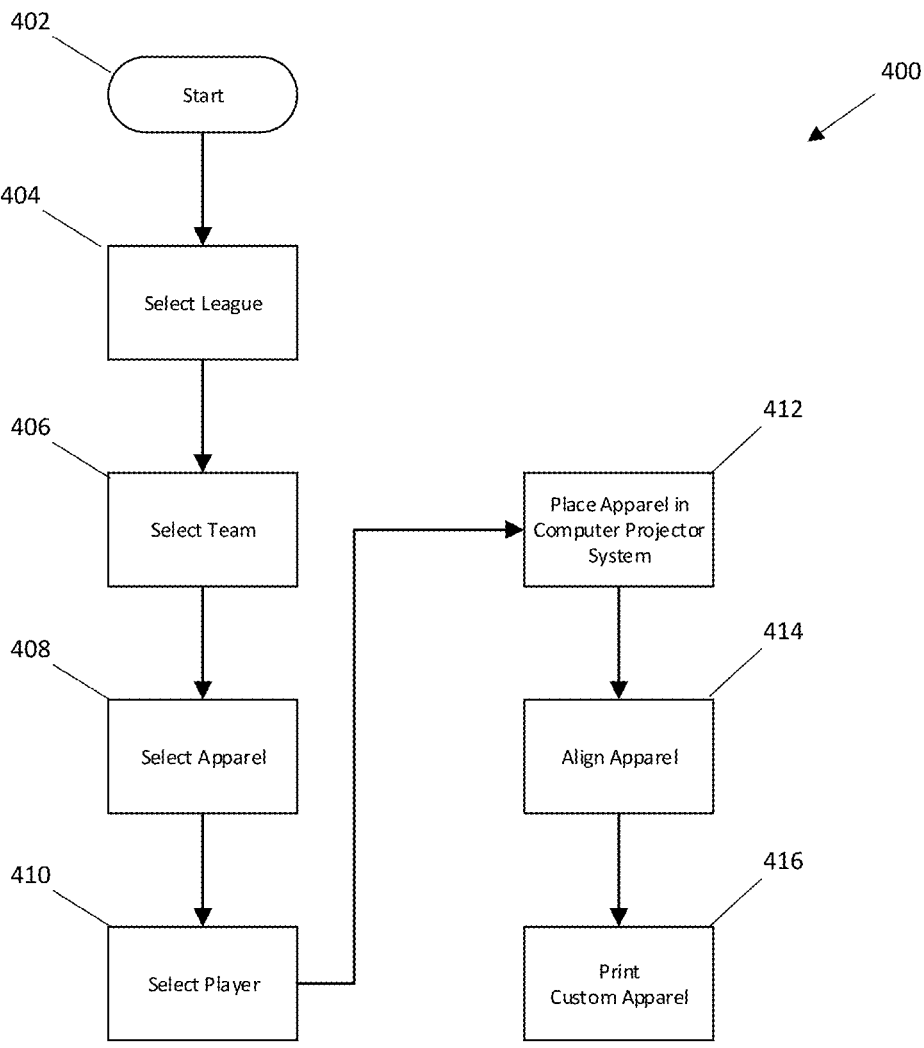
FIG. 4 is a diagram illustrating a workflow of an exemplary projector system.

FIG. 4 is a diagram illustrating a workflow of an exemplary projector system. According to FIG. 4, workflow 400 is a process of the computer projector system for printing custom jerseys or apparels supporting different sports, leagues, teams and players.

According to FIG. 4, workflow 400 initiates at step 402 where the operator or user of the computer projector system would select a sports league at step 404. Next, the user would select a team at step 406, select a unique apparel at step 408, followed by selecting a player at step 410.

According to FIG. 4, the information is then sent to the mini projector to provide for accurate alignment. The user or operator will then place the numbers, letters or team logos onto the apparel (e.g., sports jersey) at step 412. A close-up view of the placement is shown in FIG. 18.

The user would then align the apparel at step 414. Once alignment is confirmed, the user would then print the custom apparel at step 416 and heat-pressed down onto the apparel to create a complete custom apparel.

Figure 5:
FIG. 5 are exemplary snapshot views of various steps of the workflow as shown on a graphical user interface (GUI) on a computer.

FIG. 5 are exemplary snapshot views of various steps of the workflow as shown on a graphical user interface (GUI) on a computer. According to FIG. 5, graphical user interface (GUI) 502 illustrates selecting a league. GUI 504 illustrates selecting a team. GUI 506 illustrates selecting a jersey and GUI 508 illustrates selecting a player.

Figure 6:
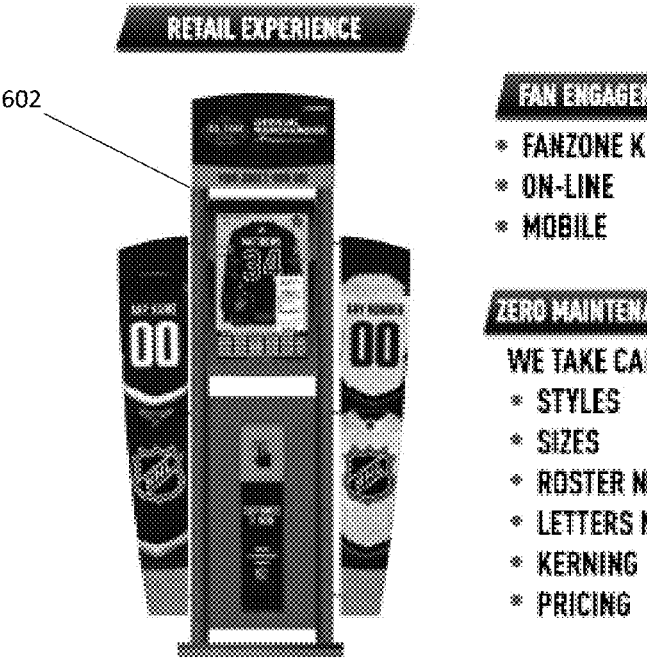
FIG. 6 is a diagram illustrating retail experience of an exemplary computer projector system.

FIG. 6 is a diagram illustrating retail experience of an exemplary computer projector system. According to FIG. 6, the customer (sports fan) chooses the desired customization in an engaging and entertaining way. Fan engagement includes having a fanzone kiosk 602, as well as applications for on-line and mobile ordering experiences.

According to FIG. 6, the computer projector system is fully stocked with current player rosters, fonts and styles for every team—so the system should provide for error-free customizations wherein the system can take care of styles, sizes, roster names, letter numbers, kerning and pricing. The system is constantly updated for changes in players, as well as team color/font changes (e.g., sports player gets traded to another team).

Figure 7:
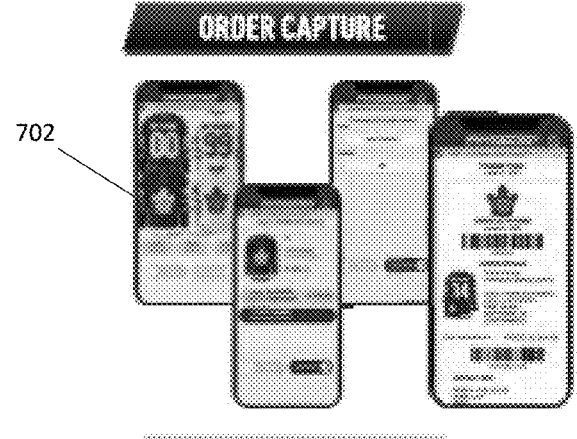
FIG. 7 is a diagram illustrating order capture and order management of an exemplary computer projector system.
Figure 7:
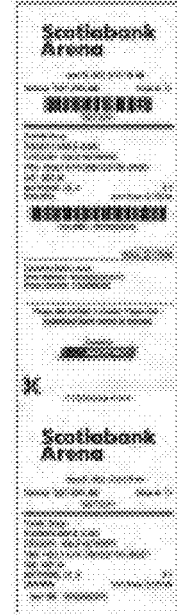

FIG. 7 is a diagram illustrating order capture and order management of an exemplary computer projector system. According to FIG. 7, the computer projector system supports order capture and order management. Order capture can be supported by an application on a mobile device 702. Order management can support tickets/virtual tickets, single or multiple barcodes, single or multiple retailers point of sale (POS) or payment systems, order management for fanzone systems and detailed/simplistic order management systems.

Figure 8:
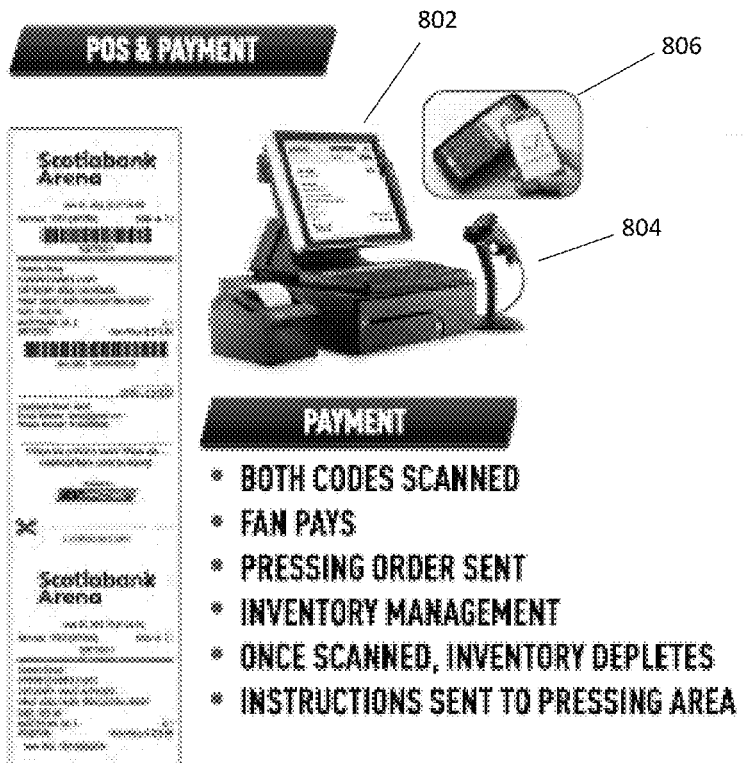
FIG. 8 is a diagram illustrating a POS and payment of an exemplary computer projector system.

FIG. 8 is a diagram illustrating a point-of-sale (POS) and payment of an exemplary computer projector system. According to FIG. 8, the computer projector system supports known point-of-sale (POS) terminals including cash registers 802, barcode scanners 804 and mobile POS terminals 806.

According to FIG. 8, once the order is sent, the computer projector system should also manage inventory management whereby once scanned, inventory is depleted and instructions are either sent to the pressing area to fulfill the customized order, or it is barcode scanned, or the purchase order (PO) is typed in.

Figure 9:
FIG. 9 is a diagram illustrating customization of an exemplary computer projector system.

FIG. 9 is a diagram illustrating customization of an exemplary computer projector system. According to FIG. 9, customization begins by scanning, selecting or entering the order. Next, the specific jersey is placed, and accurate alignment of the name, letters or numbers are initiated. The system will then enable accurate placement and accurate kerning.

Figure 10A:
FIGS. 10A to 10E are photos illustrating an exemplary computer projector system in operation.
Figure 10B:
Figure 10C:
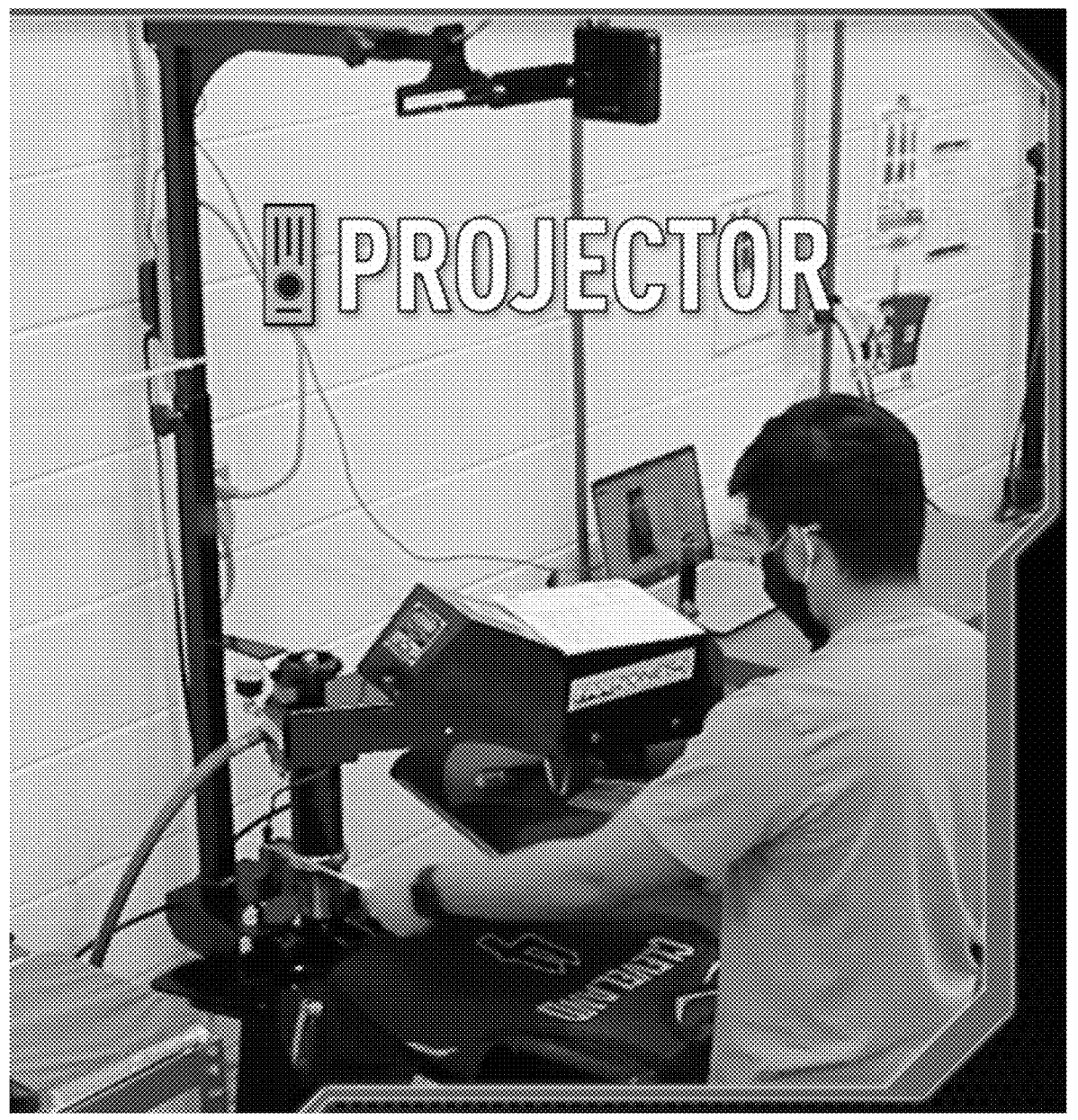
Figure 10D:
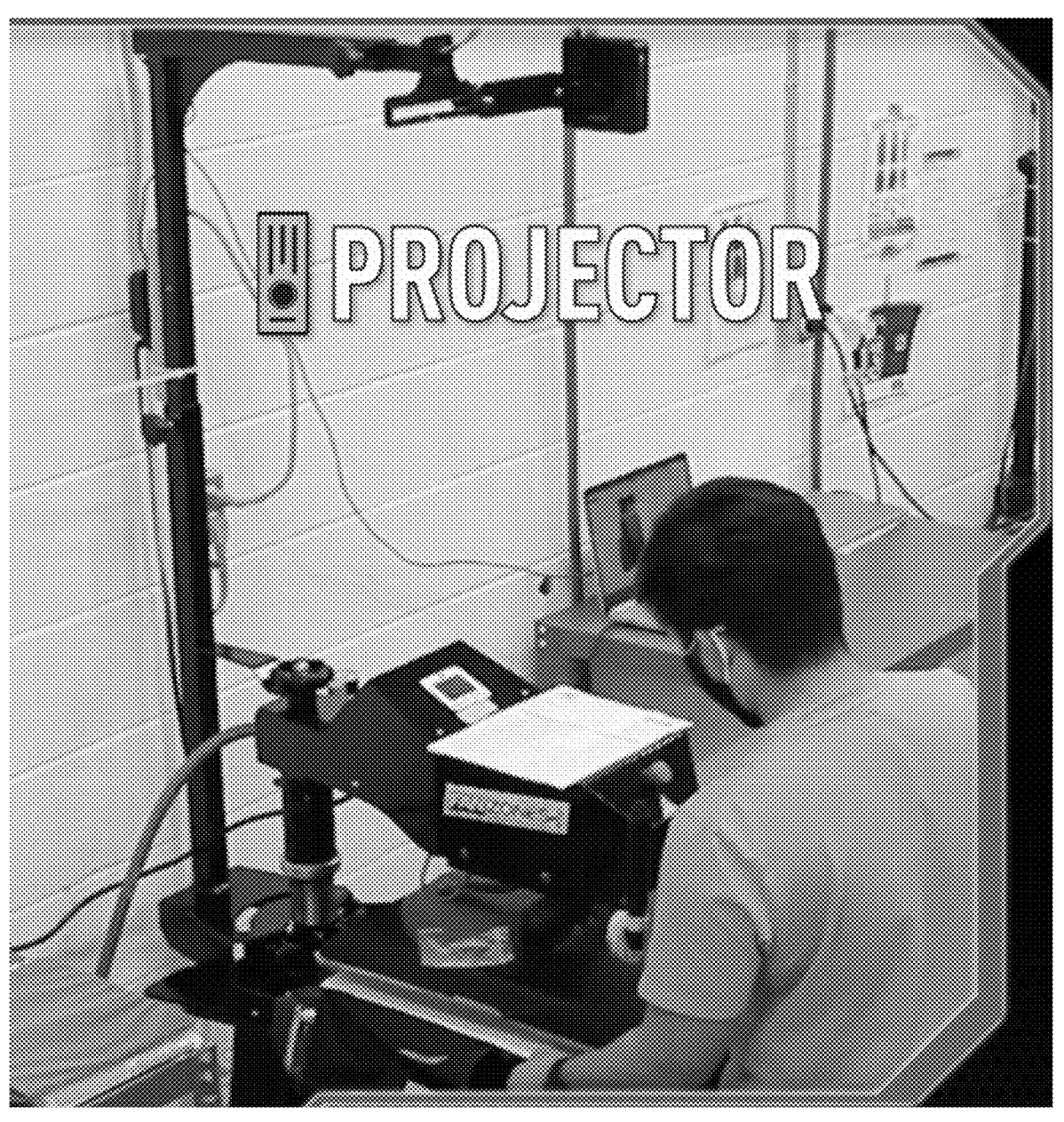
Figure 10E:

FIGS. 10A to 10E are photos illustrating an exemplary computer projector system in operation. FIG. 10A is a diagram illustrating a laptop with the AAPS software and the mini projector displaying a name and number onto a sports jersey. FIGS. 1013 to 10D illustrates a worker placing letters and numbers onto a jersey to be pressed. FIG. 10E illustrates a finished sports jersey with accurate placement of the number and letters on the sports jersey.

Figure 11A:
FIGS. 11A and 11B are mock-up diagrams of exemplary computer projector systems operated by robots in fanzone kiosks.
Figure 11B:
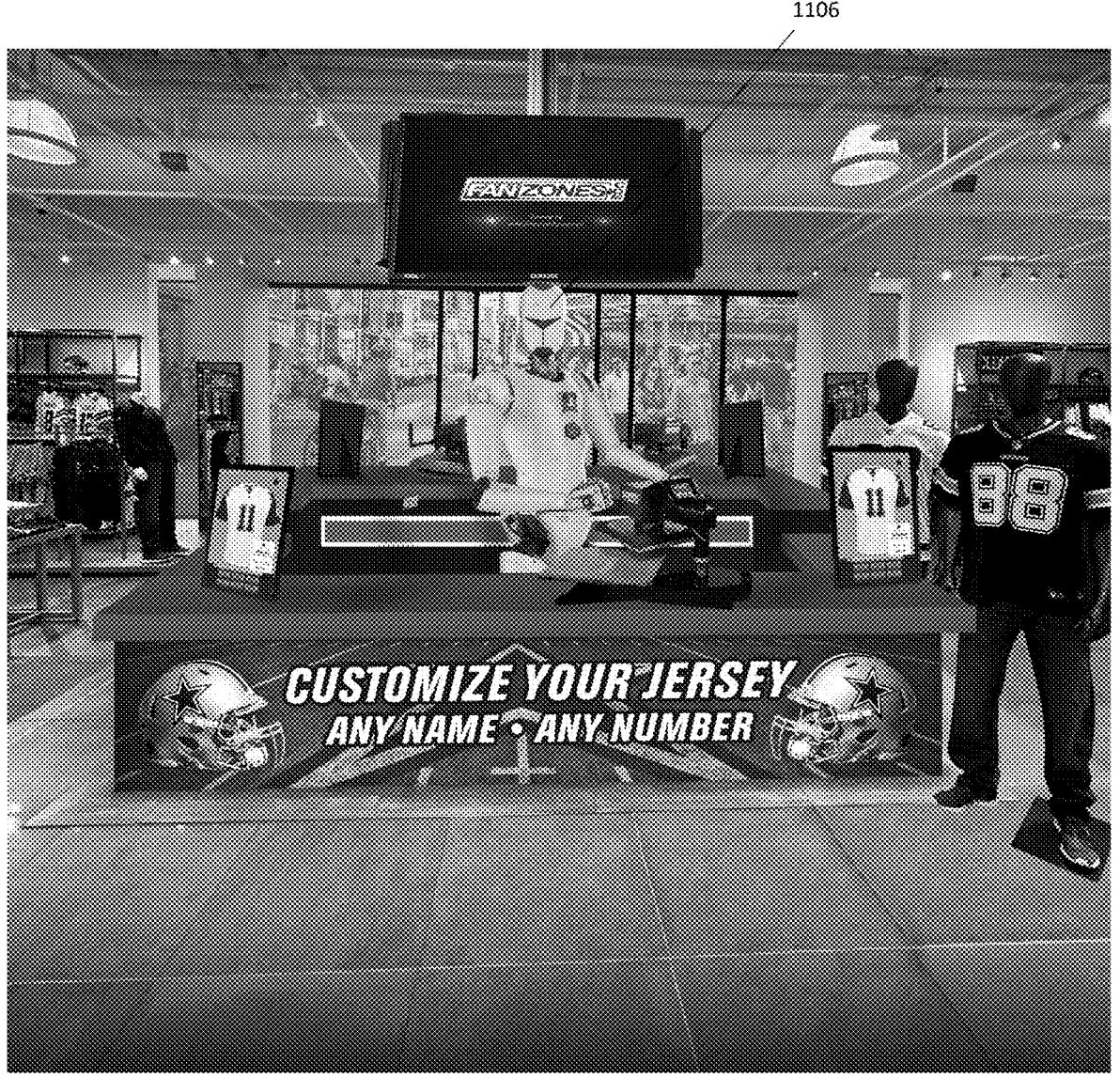

FIGS. 11A and 11B are mock-up diagrams of exemplary computer projector systems operated by robots in fanzone kiosks. According to FIGS. 11A and 11B, robotic operators 1102, 1104 and 1106 can be placed in fanzone kiosks and can assist in creating custom jerseys. The robotic operators can be programmed to work with the computer projector systems and can load, align and print the jerseys on demand without human intervention.

According to the disclosure, the computer projector system is used in in-venue events where the event is happening. There are lineups for customized products typically being produced/pressed onsite by sometimes inexperienced staff. According to the disclosure, the projector system is accurate and faster than traditional pressing methods which use special instruments, manual rulers and judgement. Furthermore, the computer projector system can also be used in customization factories where maximizing efficiency and eliminating errors is also crucial in mass-producing this customized product.

According to the disclosure, the programming used for the image generation tool is complex since it must be dynamic in the kerning of letters and numbers in various presentation formats and sizes, colors, and fonts.

According to the disclosure, projection of the image to assist manual placement of the numbers/letters provides additional efficiencies and eliminates the risk of misplacement and therefore expensive wastage of licensed product.

According to the disclosure, the computer projector system is further tied into an order management program that automatically depletes inventory for each number, letter, crest or logo used in the production of the merchandise so that reorders can be automatic.

According to the disclosure, computer systems displaying a virtual image of the merchandise and customizations may be used in the printing industry but fail to address the problem of automatically correcting for kerning and arcing on customized product in accordance with pre-determined guidelines in the sports and entertainment industries. In addition, where these computer systems then print directly onto garments, there currently is no solution for the industry that customizes with manual pressing of the physical components—typically used in customization in the sports and entertainment industries.

According to the further embodiments of the disclosure, a custom table can be integrated with the computer projector system that can house (or hold) the laptop computer and the computer projector system in an ergonomic layout for ease of use and operation.

According to the further embodiments of the disclosure, a further embodiment may replace the adjustable mechanical arm with a robotic arm that is programmed to move to different positions.

According to the further embodiments of the disclosure, machine learning (ML) or artificial intelligence (AI) algorithms can be used in software to assist with accuracy and verification of the information (or label) created. For example, AI algorithms can be used as a last verification and validation step of the label before the heat press. Furthermore, these algorithms may provide recommendations for alignment concerns and/or misplacements.

According to the disclosure, a computer-implemented method of creating custom apparel using a computer projector system is disclosed. The method comprising steps of selecting a league, selecting a team, selecting an apparel style and material, selecting a player associated with the team and league, placing the apparel on the computer projector system, projecting a label on the apparel, aligning the apparel and printing the apparel with the label associated with the league and player.

According to the disclosure, the computer projector system is configured for custom alignment and verification of the labels prior to printing of the apparel. The label of the method further comprises information related to the league, team or player.

According to the disclosure, the step of printing the apparel of the method further comprises heat pressing or providing heat on the label. The custom apparel of the method is selected from a list comprising of a jersey, a sweatshirt, a sweater, a T-shirt, a jacket, jogging pants, jeans and workout pants.

According to the disclosure a computer projector system for creating custom apparel is disclosed. The system comprises a computer, a software program on the computer configured for customization of embellishments, a mini projector, a heat press and a mounting stand.

The mount stand further comprises a base clamp, a mounting post, a projector mount; and an adapter to mount a heat press. The mounting stand detachably attaches to the heat press and the adapter connects to the mini projector. The computer projector system is configured for printing the apparel with a label associated with a league, team or player and is further configured for custom alignment and verification of the labels prior to printing of the apparel.

According to the disclosure, the label of the system further comprises information related to the league, team or player. The step of printing the apparel of the system further comprises heat pressing or providing heat on the label.

According to the disclosure, the system further comprises cables, and the computer is a laptop computer. The software program on the computer of the system further comprises cloud-based software with a database of customization embellishments. The projector mount of the system further comprises an adjustable mechanical arm or and an automated robotic arm. The mini projector of the system can be a high definition (HD) or 4K projector.

According to the disclosure the system displays an image of the customized set of numbers, letters, or patch design directly on the apparel so that the operator can manually place and press the components in a highly efficient and accurate manner.

According to the disclosure, the system corrects for kerning and arcing on the custom apparel product in accordance with pre-determined guidelines in the sports and entertainment industries.

According to the disclosure, the computer and system is further configured for integration with a custom desk. The custom apparel is selected from a list comprising a jersey, a sweatshirt, a sweater, a T-shirt, a jacket, jogging pants, jeans and workout pants.

While some embodiments or aspects of the present disclosure may be implemented in fully functioning computers and computer systems, other embodiments or aspects may be capable of being distributed as a computing product in a variety of forms and may be capable of being applied regardless of the machine or computer readable media used to affect the distribution.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The specific embodiments described above have been shown by way of example and understood is that these embodiments may be susceptible to various modifications and alternative forms. Further understood is that the claims are not intended to be limited to the forms disclosed, but to cover all modifications, equivalents, and alternatives falling within the spirit and scope of this disclosure. While the foregoing written description of the system enables one of ordinary skill to make and use what is considered presently to be the best mode thereof, those of ordinary skill will understand and appreciate the existence of variations, combinations, and equivalents of the specific embodiment, method, and examples herein. The system should therefore not be limited by the above-described embodiment, method, and examples, but by all embodiments and methods within the scope and spirit of the system. Thus, the present disclosure is not intended to be limited to the implementations shown herein but is to be accorded the widest scope consistent with the principles and novel features disclosed herein.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments which may become obvious to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, various changes and modifications in form, material, workpiece, and fabrication material detail may be made, without departing from the spirit and scope of the present disclosure, as set forth in the appended claims, as may be apparent to those of ordinary skill in the art, are also encompassed by the present disclosure.

What is claimed is:

1. A computer projector system for creating custom apparel comprising:
   a computer;
   a software program on the computer configured for customization of embellishments;
   a mini projector;
   a heat press having a base plate and an upper plate, wherein the base plate is suitable for supporting the apparel and the upper plate is rotatable between a first position over the base plate and a second position substantially clear of the base plate;
   a mounting stand, further comprising:
   a base clamp;
   a mounting post, a projector mount; and
   an adapter to mount the a heat press;
   wherein the mounting stand detachably attaches to the heat press and the adapter connects to the mini projector such that the projector is configured to project an image downwardly onto the heat press;
   wherein the computer projector system is configured for printing the apparel with a label associated with a league, team or player;
   wherein the computer projector system is configured for custom alignment and verification of the labels prior to printing of the apparel by projection of an image of the label on to the apparel as it is supported on the base plate of the heat press.

2. The system of claim 1 wherein the label further comprises information related to the league, team or player.

3. The system of claim 1 wherein the step of printing the apparel further comprises heat pressing or providing heat on the label.

4. The system of claim 1 further comprising cables, and wherein the computer is a laptop computer.

5. The system of claim 1 wherein the software program on the computer further comprises cloud-based software with a database of customization embellishments.

6. The system of claim 1 wherein the projector mount further comprises an adjustable mechanical arm or an automated robotic arm.

7. The system of claim 1 wherein the mini projector is a high definition (HD) or 4K projector.

8. The system of claim 1 wherein the system displays an image of the customized set of numbers, letters, or patch design directly on the apparel so that the operator can manually place and press the components in a highly efficient and accurate manner.

9. The system of claim 1 wherein the system corrects for kerning and arcing on the custom apparel product in accordance with pre-determined guidelines in the sports and entertainment industries.

10. The system of claim 1 wherein the computer and system is further configured for integration with a custom desk.

11. The system of claim 1 wherein the custom apparel is selected from a list comprising of a jersey, a sweatshirt, a sweater, a T-shirt, a jacket, jogging pants, jeans and workout pants.

* * * * *